(No Model.)  3 Sheets—Sheet 1.
T. WALTON.
MANUFACTURE OF COVERED GLASSWARE.

No. 286,096. Patented Oct. 2, 1883.

Witnesses
Jno. K. Smith
L. C. Fitler

Inventor
Thomas Walton
By his attys
Bakewell & Kerr (No Model.) 3 Sheets—Sheet 2.
T. WALTON.
MANUFACTURE OF COVERED GLASSWARE.
No. 286,096. Patented Oct. 2, 1883.
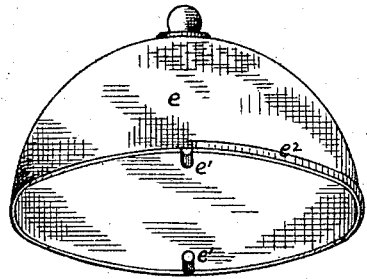
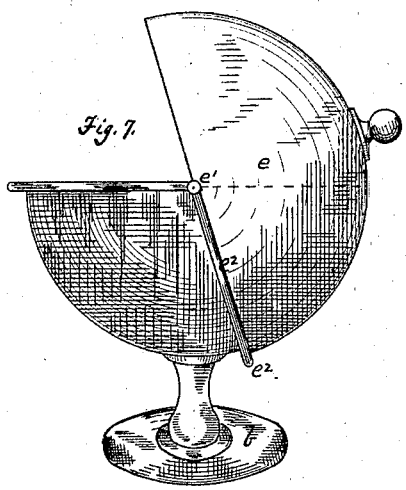
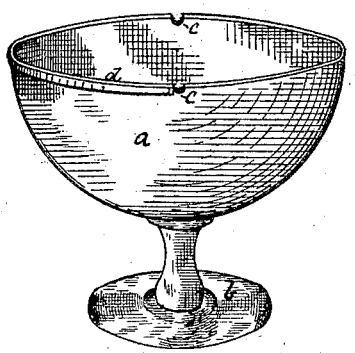
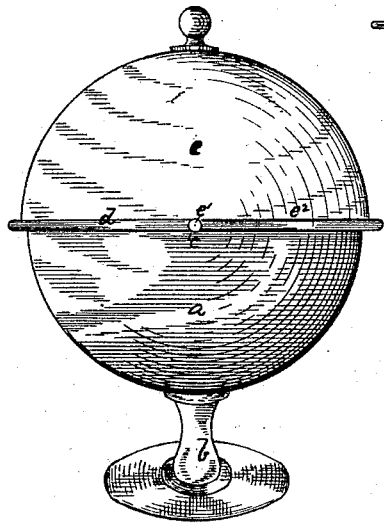
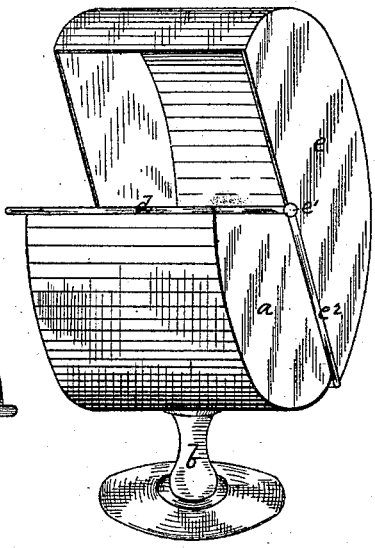
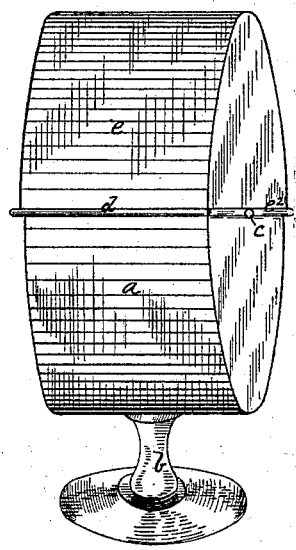
Witnesses
Jno K. Smith
L. C. Fibler
Inventor
Thomas Walton
By his attys
Bakewell & Kerr (No Model.) 3 Sheets—Sheet 3.

T. WALTON.
MANUFACTURE OF COVERED GLASSWARE.

No. 286,096. Patented Oct. 2, 1883.

Witnesses—
Jno. K. Smith
L. C. Fitler

Inventor—
Thomas Walton
By his attys
Bakewell & Kerr

UNITED STATES PATENT OFFICE.

THOMAS WALTON, OF WHEELING, WEST VIRGINIA, ASSIGNOR TO HIMSELF AND A. W. PAULL, OF SAME PLACE.

MANUFACTURE OF COVERED GLASSWARE.

SPECIFICATION forming part of Letters Patent No. 286,096, dated October 2, 1883.

Application filed June 8, 1883. (No model.)

*To all whom it may concern:*

Be it known that I, THOMAS WALTON, of Wheeling, in the county of Ohio and State of West Virginia, have invented a new and useful Improvement in the Manufacture of Covered Glassware; and I do hereby declare the following to be a full, clear, and exact description thereof, reference being had to the accompanying drawings, forming a part of this specification, in which—

Figure 1:
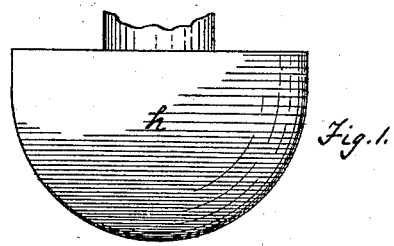
Figure 2:
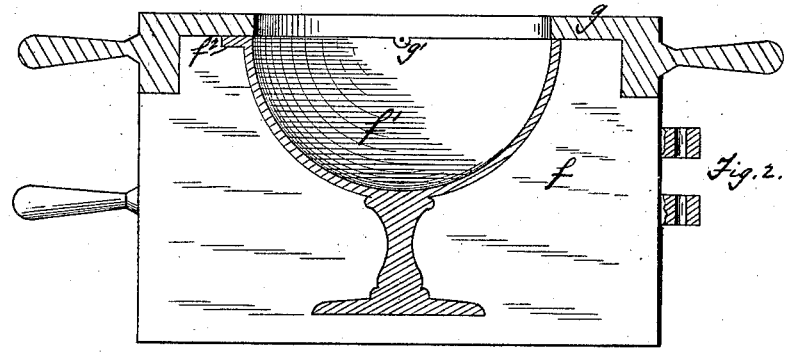
Figure 3:
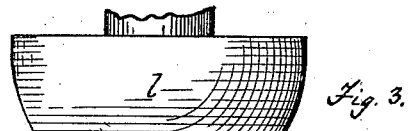
Figure 4:
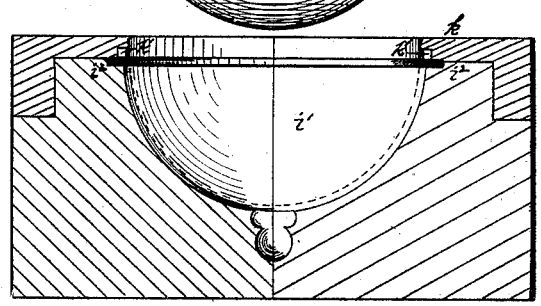
Figure 11:
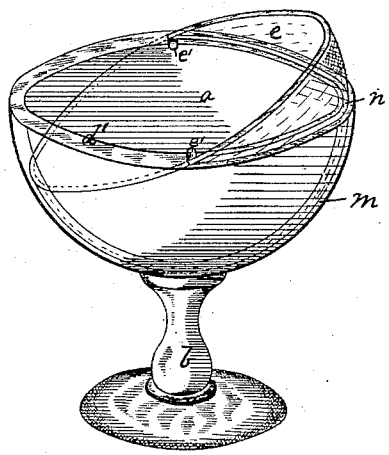
Figure 12:
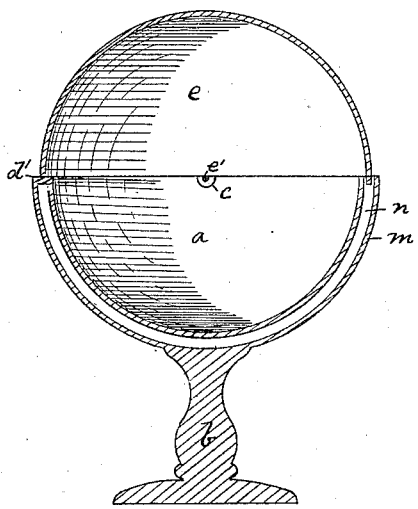

Figures 1 to 4 are views of my improved molds and plungers for making a glass dish with turning glass lid or cover. Figs. 5 to 8 are views of the dish and cover made by molds and plungers shown in Figs. 1 to 4. Figs. 9 and 10 are views of a modified form of the article shown in Figs. 5 to 8. Figs. 11 and 12 are views of another form of the article.

Like letters of reference indicate like parts in each.

The object of this invention is the production of a glass dish of suitable hemispherical or equivalent shape, having an approximately-shaped glass lid or cover hinged thereto, so as to be capable of turning or swinging over the open mouth of the article by a radial movement around the axis of the sphere formed by the dish or cover. Such a dish or article is shown in Fig. 6, and the cover in Fig. 5. The bowl $a$ of the dish is of hemispherical shape, and is provided with a suitable foot, $b$, notches $c$, for the reception of the pivots on the cover, and a semicircular flange, $d$, extending around the edge on one side between the notches $c$. The cover $e$ is slightly larger than the bowl and of similar shape. It is provided with pivots or pintles $e'$, arranged diametrically and projecting inward, and with a semicircular flange, $e^2$, around its edge, on the side opposite to the flange $d$ on the bowl, so that when the cover is in place and the dish closed the appearance of a continuous flange on the vessel is presented, as shown in Fig. 8. When in this position, the flange $d$ acts as a stop or seat for the front edge of the cover and prevents it from swinging over too far. When the cover is open, its rear edge rests against the stem or foot $b$ and stops it.

The article is made by means of the improved molds and plungers shown in Figs. 1 to 4. The bowl-mold $f$ is made in two or more parts; or the stem and foot $b$ may be formed in a partible mold, and the bowl $a$ in a solid mold resting upon and properly secured to the partible foot-mold. Around the edge of the bowl-cavity $f'$, on one side, is a groove or recess, $f^2$, for forming the flange $d$. On top of the mold is a mold-ring, $g$, which projects inward slightly over the edge of the mold-cavity, for the purpose of forming the upper edge of the bowl, the plunger $h$ passing nicely through the hole in the ring. The ring is provided with semi-cylindrical lugs $g'$, which are designed to form the recesses or notches $c$ in the edge of the bowl.

The cover-mold $i$, which may be either solid or partible, depending on the form of the knob $e^3$, is provided with a semicircular recess or cavity, $i^2$, communicating with the mold-cavity $i'$, for forming the flange $e^2$, and with a ring, $k$, similar to the ring $g$, except that it has holes or recesses $k'$, for forming the pivots $e'$, instead of the lugs $g'$. After the cover $e$ has been pressed in the mold $i$, the pivots $e'$, which are pressed vertically, are reheated and turned to a horizontal position, in order to be fitted into the recesses $c$. The mold $i$ has a suitable plunger, $l$. With these molds and plungers the bowl $a$ and cover $e$ are pressed in the usual way.

In Figs. 9 and 10 I show a similar vessel, but of round form with flat sides. This vessel and cover are pressed in suitable molds of the construction and in the manner described.

In Figs. 11 and 12 I show a vessel similar in form to that shown in Figs. 7 and 8, but provided with an outer bowl, $m$, having the foot $b$ attached thereto. The cover $e$ swings in the recess $n$ between the shells $a'$ and $m$, which are pressed separately and then joined by means of the flange $d'$. In this construction the cover $e$ has no flange, and no flange projects outward from the bowl $m$; but, if desired, such a flange may be provided on the back edge of the cover, and such flange operate as a stop to prevent the cover swinging too far into the recess $n$. A similar flange may also be formed on the edge of the shell $m$ to give finish to the article; or the shell $m$ may be made with a flange extending entirely around it, and the flange of the cover rest thereon, or in a recess of suitable shape formed therein.

I will here state that I do not limit myself to the forms of the bowl and cover shown, but claim all forms which, provided with a suitable pivot, permit the cover to swing around the outside of the bowl on an axis common to both cover and bowl and to close or open the latter; nor do I limit myself to the precise forms of molds and plungers shown, but claim, broadly, molds and plungers producing the articles having the characteristics named; nor do I limit myself to the form and construction of the hinge shown and described.

If desired, the bowl may be provided with pintles and the cover with notches; or, instead of forming the pintles in the mold, the mold-ring may be provided with small projections or scores to produce a mark on the bowl or cover to indicate the proper location of the hinge, and the pintles or journals of glass or metal may be stuck or fastened on at such points.

What I claim as my invention, and desire to secure by Letters Patent, is—

1. A mold for forming glass bowls adapted for use with swinging covers, or for forming the covers, provided with a mold-ring having projections thereon for forming notches or bearings in the edge of the article for the pintles or journals upon which the cover turns, substantially as and for the purposes described.

2. A mold for forming glass bowls adapted for use with swinging covers, or for forming the covers, provided with a mold-ring having recesses or holes therein for forming the pintles or journals upon which the cover turns, substantially as and for the purposes described.

3. A mold for forming glass bowls adapted for use with swinging covers, or for forming the covers, provided with a mold-ring having projections or scores for marking the location of the pintles, substantially as and for the purposes described.

4. A mold for forming glass bowls or covers, provided with a mold-ring having a semicircular recess or cavity in its lower face, for forming a flange or bead around one portion of the edge of the article, substantially as and for the purposes described.

5. A glass bowl having a glass cover journaled thereon and capable of swinging around the outside of the bowl, substantially as and for the purposes described.

6. A glass bowl having a journaled glass cover capable of swinging around the outside of the bowl, in combination with an external glass bowl or casing secured to the first bowl, so as to form a recess, into which the cover turns, substantially as and for the purposes described.

In testimony whereof I have hereunto set my hand this 21st day of May, A. D. 1883.

THOMAS WALTON.

Witnesses:
A. J. CLARKE,
J. D. ELSON.